Dec. 12, 1967 J. F. BUCHER 3,358,228
RESISTANCE MEASURING CIRCUIT HAVING SPURIOUS
RESISTANCE COMPENSATING MEANS
Filed Feb. 6, 1961 3 Sheets-Sheet 1
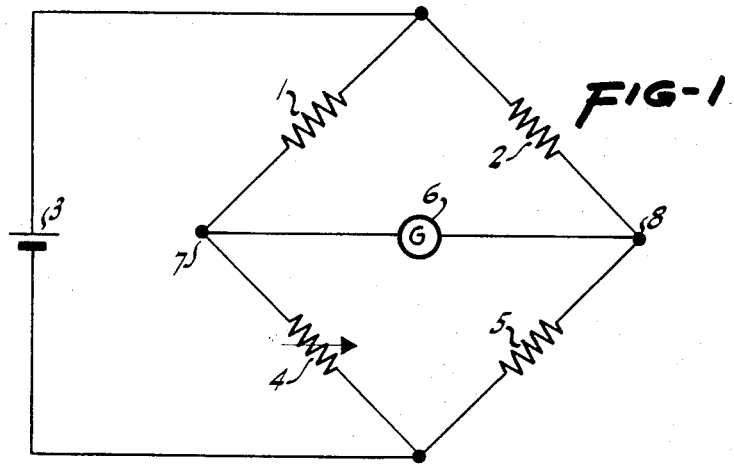
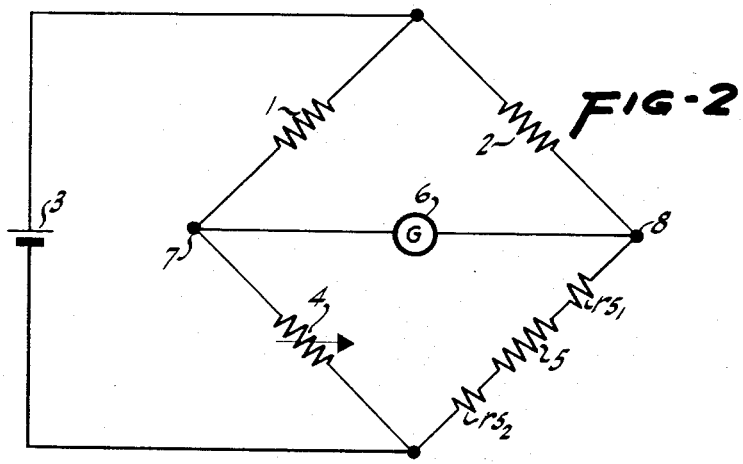
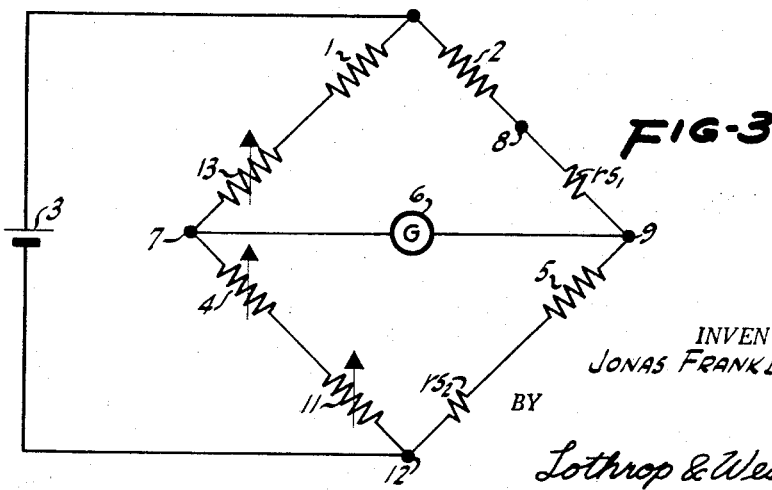
INVENTOR.
JONAS FRANK BUCHER
BY
Lothrop & West
ATTORNEYS

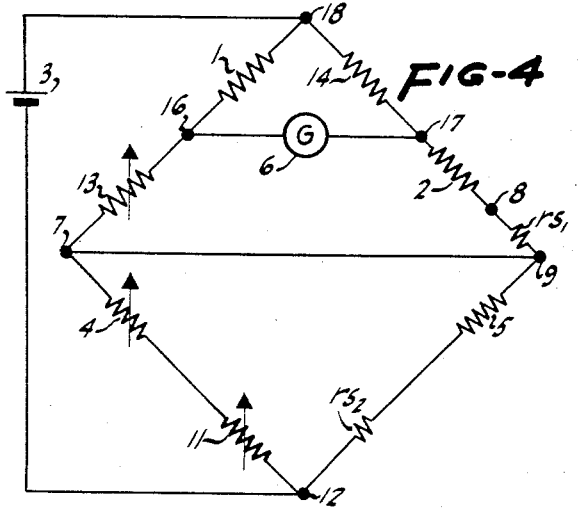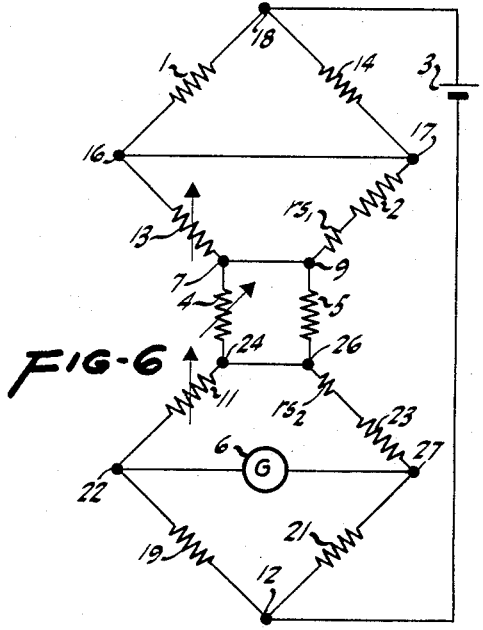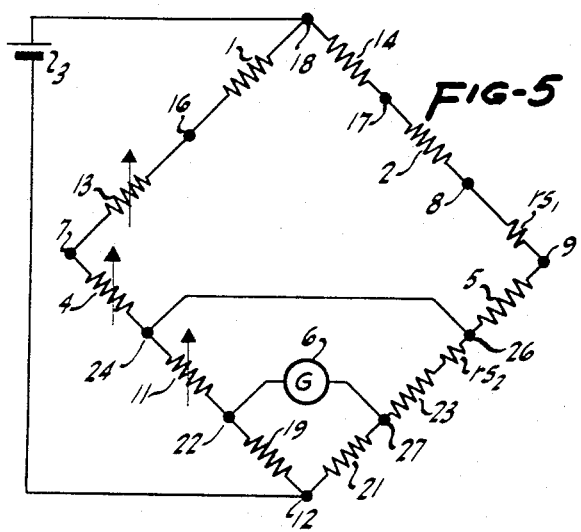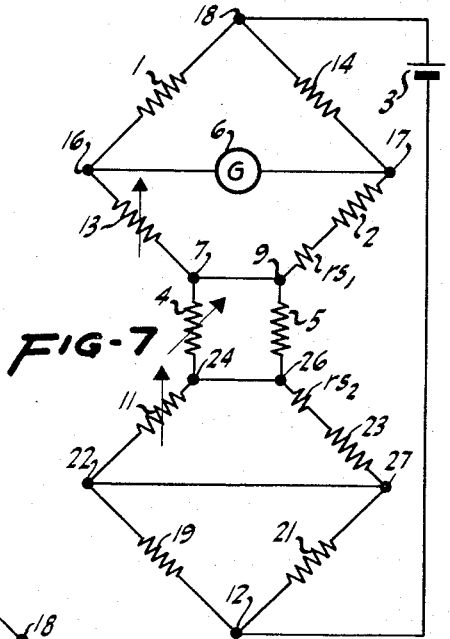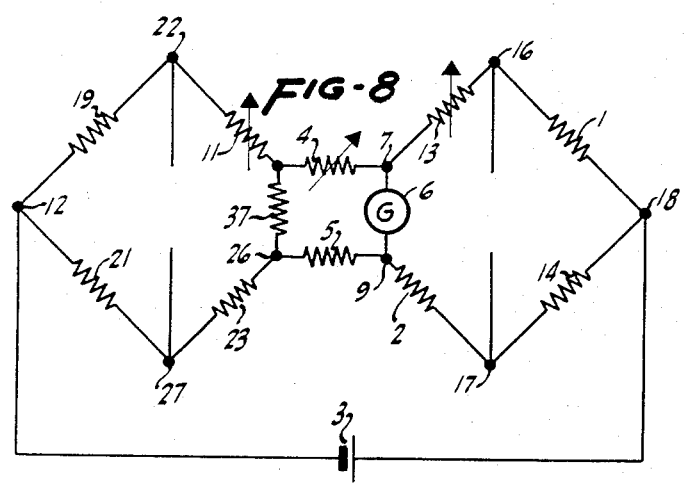
INVENTOR.
JONAS FRANK BUCHER
BY
Lothrop & West
ATTORNEYS

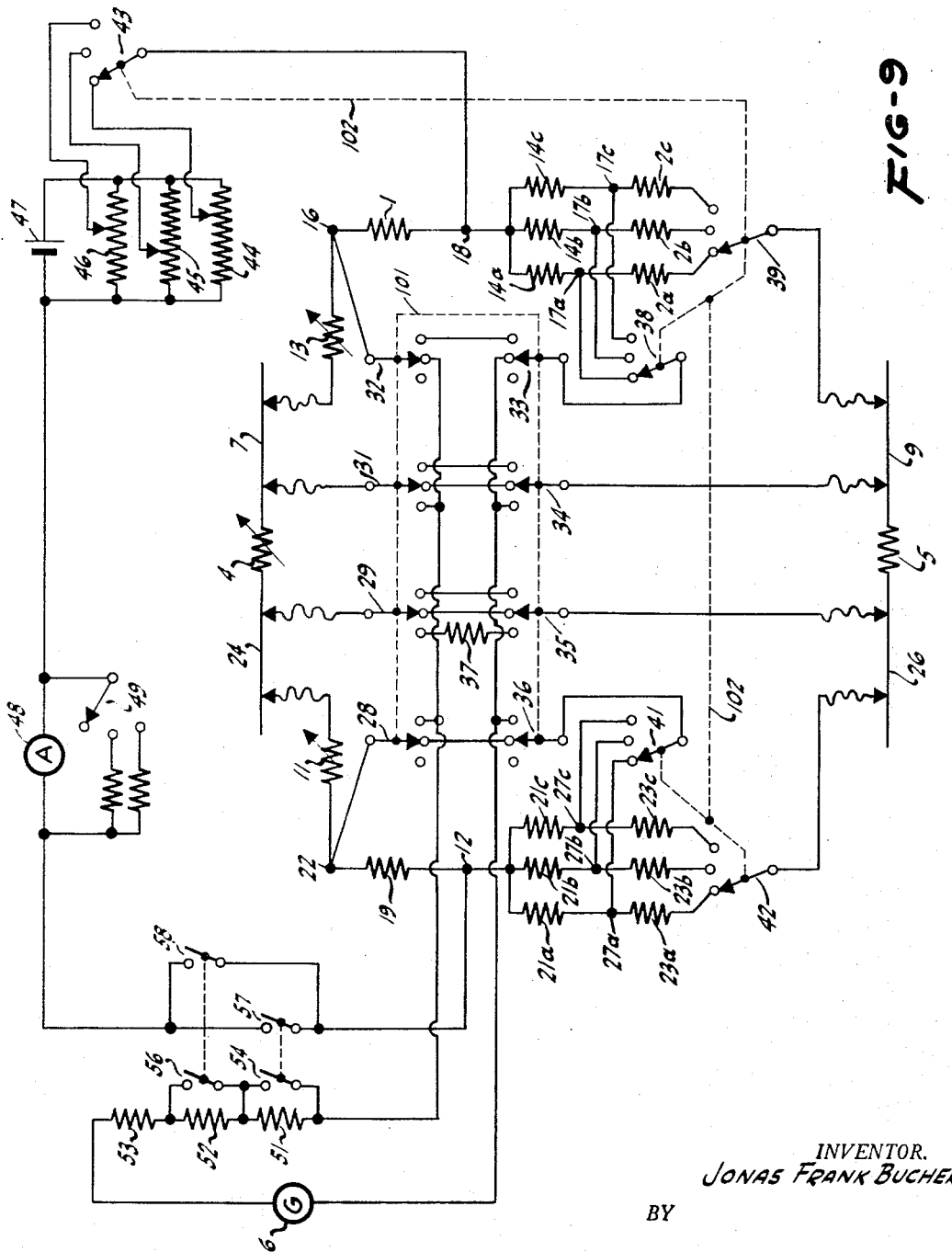

United States Patent Office 3,358,228
Patented Dec. 12, 1967

3,358,228
RESISTANCE MEASURING CIRCUIT HAVING SPURIOUS RESISTANCE COMPENSATING MEANS
Jonas Frank Bucher, 9336 Pershing Ave.,
Orangevale, Calif. 95662
Filed Feb. 6, 1961, Ser. No. 87,464
1 Claim. (Cl. 324—62)

The invention relates generally to electrical measuring instruments and, more particularly, to electrical bridge measuring devices for determining the values of unknown resistances.

Numerous electrical bridges of various kinds have made their appearance and, in general, have served reasonably adequately to measure unknown resistance values. Very few, however, have been able to measure with extreme accuracy, for example, of the order of the fifth or sixth decimal place. Furthermore, few, if any, have enabled the user to correct for transient or changing lead resistances while the unknown resistor remains attached to the bridge leads.

It is therefore an object of the invention to provide an extremely accurate electrical resistance testing device.

It is another object of the invention to provide an electrical testing device in which corrections can be made while the unknown resistances remain connected to the device.

It is a further object of the invention to provide a highly versatile electrical testing device.

Other objects, together with the foregoing, are attained in the embodiment described in the following description and shown in the accompanying drawings in which:

FIGURE 1 is a circuit diagram of a simple measuring bridge;

FIGURE 2 is a diagram comparable to that of FIGURE 1 but showing the addition of two spurious resistances in the unknown resistance leg;

FIGURE 3 illustrates a rearrangement of the circuit of FIGURE 2 and the addition of two additional, variable resistance members;

FIGURE 4 shows the addition of still another resistance member and a rearrangement of the galvanometer for nulling a first portion of the bridge;

FIGURE 5 shows a bridge circuit with the galvanometer in another position, suitable for nulling a second portion of the bridge, and also illustrates an additional cross-connection;

FIGURE 6 is comparable to FIGURE 5 but presents the elements in a ten-sided or decagon arrangement and with three cross-connections;

FIGURE 7 is substantially identical to FIGURE 6, but with the location of the galvanometer changed;

FIGURE 8 shows the decagon bridge in its customary operating condition with the spurious resistance compensated for; and FIGURE 9 is a diagram of the fully developed decagon bridge circuit.

While the decagon bridge of this invention is susceptible of numerous physical embodiments, depending on the environment and requirements of use, substantial numbers of the herein shown and described embodiment have been made, tested and used, and have performed in a highly successful manner.

In order to describe, with greatest clarity, the construction and operation of the decagon bridge device, a short discussion of bridge theory will, it is believed, be helpful.

Accurate resistance measurement is generally accomplised by a comparison method. The unknown resistance is compared in value with a known, standard resistance. A comparison device often used is a Wheatstone bridge, said bridge having four resistors and using a galvanometer to detect the quality of comparison.

Such a bridge is shown in FIGURE 1, and comprises fixed resistors 1 and 2 having a common junction which joins one side of a battery 3. The other side of the battery 3 joins the common junction of a calibrated variable resistor 4 and an unknown resistor 5. The calibrated variable resistor 4 is joined to the fixed resistor 1 at the end opposite the common junction of the resistor 1 and the resistor 2, namely at a common junction 7. Similarly, the unknown resistor 5 is joined to the fixed resistor 2 at a common junction 8. A galvanometer 6 is connected between the junction 7 of resistors 1 and 4, and the junction 8 of resistors 2 and 5.

The resistors 1 and 4 form a voltage divider across the battery 3, as do the resistors 2 and 5. If the fraction of battery voltage at junction 7 is equal to the fraction of battery voltage at junction 8, then no current will flow through galvanometer 6, and the bridge is said to be nulled, or balanced. The mathematical relationship between the resistance values of resistors 1, 2, 4 and 5 is then fixed. If $R_5$ denotes the value of the unknown resistor 5, then, when the bridge is nulled, $R_5 = R_2 R_4 / R_1$.

Therefore, the value of the unknown resistor 5 may be obtained by balancing, or nulling, the bridge, said nulling being effected by adjustment of the calibrated variable resistor 4. Resistors 1 and 2 must have known values or have a known relationship one to the other.

The bridge pictured in FIGURE 1 is simple, and the resistances involved are assumed to be lumped as shown. However, in an actual device, spurious resistances are encountered which reduce the accuracy of the measurement of the unknown resistance. Such spurious resistances are shown in FIGURE 2, which is FIGURE 1 redrawn with the spurious resistances indicated as $rs_1$ and $rs_2$. Said spurious resistances generally are comprised of connecting-wire resistance and connector and switch-contact resistance, the wire, connector and switch being used to attach the unknown resistor 5 to the bridge circuit.

A rearrangement of the circuit of FIGURE 2 is shown in FIGURE 3. One end of the galvanometer 6 has been moved from junction 8 to a junction 9, said junction 9 lying between $rs_1$ and the unknown resistor 5. Spurious resistance $rs_1$ is now included in that part of the bridge containing the fixed resistor 2 and $rs_2$ is in the leg containing the unknown resistance 5. An adjustable resistor 13 has been added to the part or leg of the bridge containing the fixed resistor 1. Said resistor 13 may be adjusted to compensate for spurious resistance $rs_1$. Likewise, an adjustable resistor 11 has been added to that part of the bridge circuit containing the calibrated variable resistor 4. Said adjustable resistor 11 may be used to compensate for spurious resistance $rs_2$ which occurs in that part of the bridge containing the unknown resistor 5.

Compensation of the spurious resistances referred to above can be effected by utilizing the principle of the Wheatstone or balanced bridge as applied to various portions of the bridge being developed. With reference to the circuit shown in FIGURE 4, it will be seen that addition of a known resistor 14 to the branch of the bridge containing the resistor 2, between the resistor 2 and the junction 18, allows a balanced bridge action if junction 7 is connected directly to junction 9, and the galvanometer 6 is placed between junctions 16 and 17. Resistor 13 may then be adjusted to compensate for $rs_1$. With no current flow in galvanometer 6, the voltage drop from junction 18 to junction 16 will be equal to the voltage drop from junction 18 to junction 17. In like manner the voltage drop from junction 16 to junction 7 will equal the voltage drop from junction 17 to junction 9. Thus, by nulling current flow in galvanometer 6, by adjusting the resistor 13, the effect of spurious resistance $rs_1$ is eliminated.

Compensation of $rs_2$ may be effected as shown in FIGURE 5. A fixed resistor 19 is added between variable resistor 11 and junction 12. Resistors 21 and 23 are added between $rs_2$ and junction 12. Junction 24 is thereupon connected directly to junction 26 located between spurious resistance $rs_2$ and unknown resistance 5 and galvanometer 6 is connected between junctions 27 and 22. Once again a balanced bridge circuit is formed and adjustment of variable resistor 11 is made to compensate for spurious resistance $rs_2$.

FIGURE 6 illustrates a rearrangement of the circuit shown in FIGURE 5 into a ten-sided, or ten-legged, or decagon bridge, and with a cross-connection between the junctions 7 and 9 as well as between the junctions 16 and 17. The addition of these connections does not affect the operation of the device or the accuracy obtained by nulling across the galvanometer 6 so that compensating for $rs_2$ by appropriate adjustment of variable resistor 11 in the manner set forth above in connection with the circuit of FIGURE 5.

FIGURE 7 is identical with FIGURE 6 except for the relocation of the galvanometer 6 to a position intermediate the junctions 16 and 17. This arrangement is somewhat comparable to that of FIGURE 4, but with the additional elements described above, and enables the user to compensate for spurious resistance $rs_1$ by suitable adjustment of variable resistor 13.

After the spurious resistances $rs_1$ and $rs_2$ are compensated for, the operator can proceed to measure, with great precision, the unknown resistance 5.

FIGURE 8 illustrates the decagon bridge in its customary operating, or resistance measuring, condition, the galvanometer 6 being intermediate the junctions 7 and 9 and with the connections open between junctions 16–17 and 22–27. In this set-up, the spurious resistances $rs_1$ and $rs_2$ are not illustrated as they have been compensated for, as described above in detail, and measurement of the unknown resistance 5 can be made.

With further reference to FIGURE 8, it is noted that a resistor 37, also referred to in connection with FIGURE 9, acts as a first junction device while the galvanometer 6 acts as a second junction device to connect the calibrated variable resistor 4 and the unknown resistor 5 in parallel. On either side of the so-connected resistors 4 and 5 there are bridge-like networks, one having the junction 12 as a primary terminal and the other having the junction 18 as a secondary terminal. The junctions 22 and 27 serve as first and second connecting means, respectively, while the junctions 16 and 17 serve as third and fourth connecting means, respectively.

The circuitry can not only be considered to include two bridge-like networks, but also can be considered as including a pair of voltage dividers. For example, in FIGURE 8 one voltage divider includes the known resistors 1 and 19, the variable resistors 11 and 13 and the calibrated variable resistor 4, all arranged in series between the junctions 12 and 18 across the battery 3. The other voltage divider in shunt with the one just described includes the known resistors 14 and 21, the additional known resistors 2 and 23, and also the unknown resistor 5, all arranged in series between the junctions 12 and 18, with the unknown resistor 5 being arranged symmetrically with respect to the calibrated variable resistor 4.

FIGURE 9 diagrams the fully developed decagon bridge circuit. Said bridge circuit comprises the resistors, as specified above, together with switches to effect or set up the circuits as described hereinabove, and further switches for selection of the value range of resistance measurement. The circuit also comprises means for protecting galvanometer movement, and apparatus for monitoring current.

The circuit set up switches include a plurality of switches 28, 29, 31, 32, 33, 34, 35, and 36, all linked on a common mechanical shaft, or operating mechanism 101, and these switches perform the operations described above to select various bridge circuits for the compensation of spurious resistances. FIGURE 9 shows that a plurality of circuit connections can be made, and the arrangement also ensures that the only bridge in use is the desired bridge for the particular function being performed.

The arrangement of switches as shown in FIGURE 9 provides the type of circuit shown and described in connection with FIGURE 7, where the galvanometer is connected across junctions 16 and 17, where junctions 7 and 9 are connected to each other, and where, in practice, additionally, junction 24 is connected to junction 26 and junction 22 is connected to junction 27. Here adjustment of variable resistor 13 compensates for $rs_1$.

Similarly, for the arrangement shown in FIGURES 5 and 6, where $rs_2$ is to be compensated for, junction 24 is connected to junction 26, and, in practice, additionally, junction 7 is connected to junction 9, and junction 16 is connected to junction 17. In this circuit, the galvanometer is connected intermediate the junctions 22 and 27. In order to effect this arrangement, the mechanical linkage 101 is moved toward a right-hand direction, as appears in FIGURE 9, thus locating the galvanometer between junctions 22 and 27.

After compensation for spurious resistance, and the unknown resistance measurement is to be made all the above direct or cross-connections are broken, the galvanometer 6 is placed between junctions 7 and 9, and a resistor 37 is connected between junctions 24 and 26, all as most clearly appears in FIGURE 8, and as is brought about by moving the linkage 101 to the far left position. The resistor 37 shunts the galvanometer 6 for the customary operation.

Referring also to FIGURE 9 it is seen that further switches 38, 39, 41, and 42 comprise the resistance value range selection means. These switches are linked by a common mechanical shaft or operating mechanism 102.

Switching means 43, also linked mechanically to the switches 38, 39, 41, and 42, allows adjustment of the voltage across the bridge by providing connections to appropriate potentiometers 44, 45, and 46.

A battery 47 supplies the electrical power for the measuring bridge.

Total current drawn by the bridge is monitored by an ammeter 48 and associated range adjustment means 49 for said ammeter 48.

Galvanometer 6 has protection against movement damage by current limiting resistors 51, 52, and 53, and attendant switches 54 and 56, mechanically connected to energizing switches 57 and 58. Since the energizing switches 57 and 58 are in series with the main current lead to the measuring bridge current flows in the bridge only when a measurement is made. Such a limitation on current flow reduces any effects of heating in the bridge caused by power dissipation of each of the resistors comprising the bridge circuit.

Thus, in one unit there is incorporated a sensitive bridge-type resistance measuring device with compensation for spurious resistances arising from the mechanical construction of any such bridge. All the switches 28, 29, 31, 32, 33, 34, 35, and 36, together with the switches 38 and 41, are located at equipotential points when the bridge is in complete balance. Therefore, no current will flow through these switches and their contact resistance will not influence bridge balance and the consequent accuracy of a resistance measurement. The switches 39 and 42 have contact resistances but these are included in the spurious resistance referred to hereinabove. All other switching means are outside the bridge circuit and therefore do not affect the balancing of the bridge.

It can therefore be seen that the decagon bridge of the invention provides an extraordinarily accurate, convenient and versatile measuring device.

What is claimed is:

An electrical resistance testing device comprising an unknown resistor, a calibrated variable resistor, a first electrical conductor and a second electrical conductor for connecting said unknown resistor and said calibrated variable resistor in parallel, a primary terminal, a secondary terminal, a battery connected across said primary and secondary terminals, a first known resistor at one end connected to said primary terminal, a first variable resistor at one end connected to said first electrical conductor, first means for connecting together the other ends of said first known resistor and said first variable resistor, a second known resistor at one end connected to said primary terminal, a first leg including a third known resistor as well as means having one spurious resistance in series therewith, said first leg at one end being connected to said first electrical conductor, second means for connecting together the other ends of said second known resistor and said first leg, a fourth known resistor at one end connected to said secondary terminal, a second variable resistor at one end connected to said second electrical conductor, third means for connecting together the other ends of said fourth known resistor and said second variable resistor, a fifth known resistor at one end connected to said secondary terminal, a second leg including a sixth known resistor as well as means having another spurious resistance in series therewith, said second leg at one end being connected to said second electrical conductor, fourth means for connecting together the other ends of said fifth known resistor and said second leg, a galvanometer, and means for connecting said galvanometer in said first electrical conductor, means for selectively connecting said galvanometer alternatively in said first electrical conductor or between said first and second connecting means or between said third and fourth connecting means.

References Cited

UNITED STATES PATENTS

| | | | |
|---|---|---|---|
| 2,246,575 | 6/1941 | Coleman | 324—62 |
| 2,437,639 | 3/1948 | Floyd | 324—57.2 |
| 2,729,099 | 3/1956 | Rosenthal | 73—73 |
| 2,821,681 | 1/1958 | Baker | 324—62 |
| 2,934,699 | 4/1960 | Offner | 324—57 |
| 2,980,852 | 4/1961 | Mell | 324—62 |

FOREIGN PATENTS 541,942    12/1941    Great Britain.

RUDOLPH V. ROLINEC, *Primary Examiner.*

WALTER L. CARLSON, *Examiner.*

J. P. O'BRIEN, C. A. S. HAMRICK, W. H. BUCKLER, E. E. KUBASIEWICZ, *Assistant Examiners.*